May 30, 1961 A. F. GLAUBKE ET AL 2,986,275
ARTICLE FEEDING AND EJECTING APPARATUS
Filed Aug. 21, 1957 3 Sheets-Sheet 1
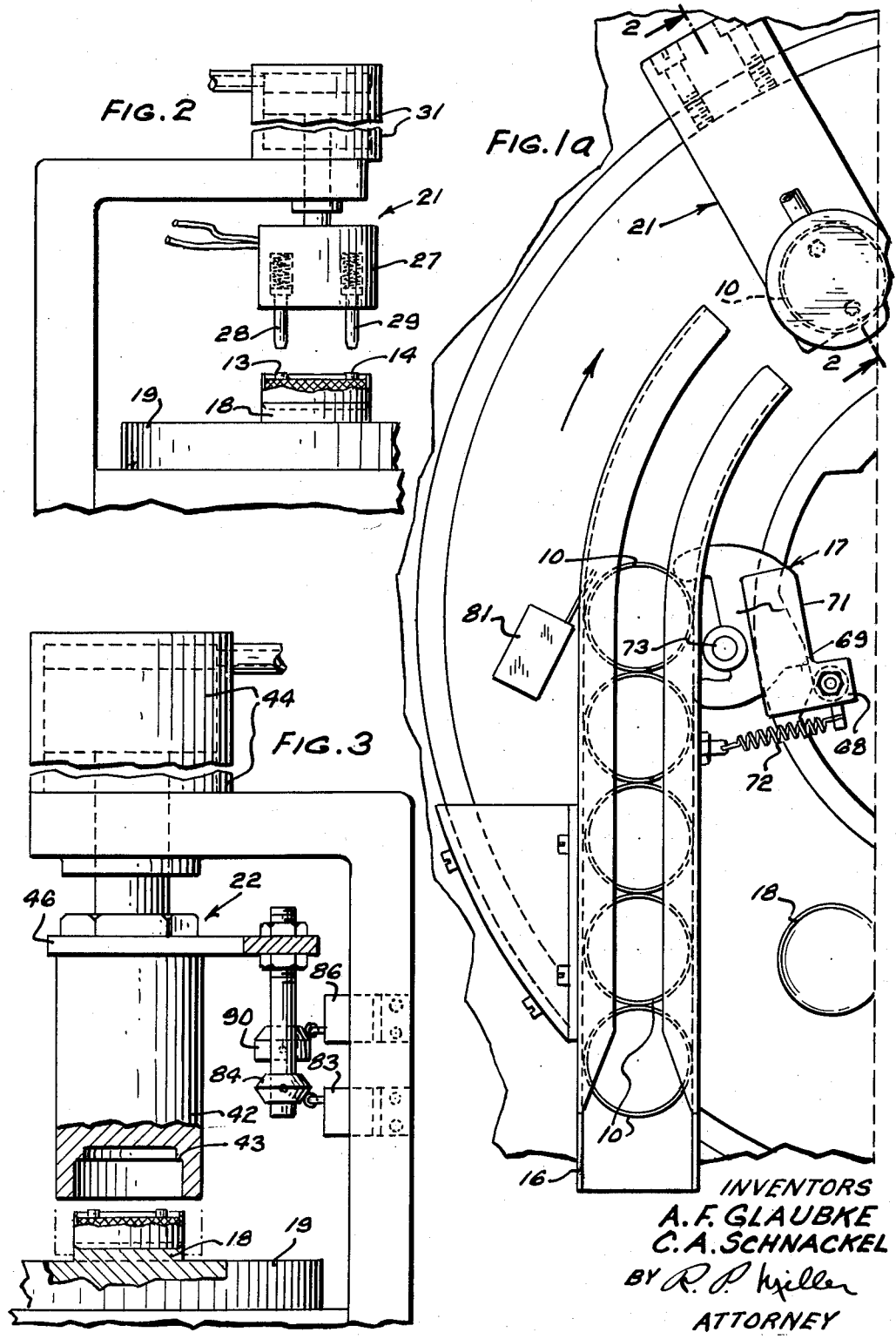
INVENTORS
A. F. GLAUBKE
C. A. SCHNACKEL
BY R. P. Miller
ATTORNEY May 30, 1961   A. F. GLAUBKE ET AL   2,986,275
ARTICLE FEEDING AND EJECTING APPARATUS
Filed Aug. 21, 1957   3 Sheets-Sheet 2

INVENTORS
A. F. GLAUBKE
C. A. SCHNACKEL
BY R. P. Miller
ATTORNEY

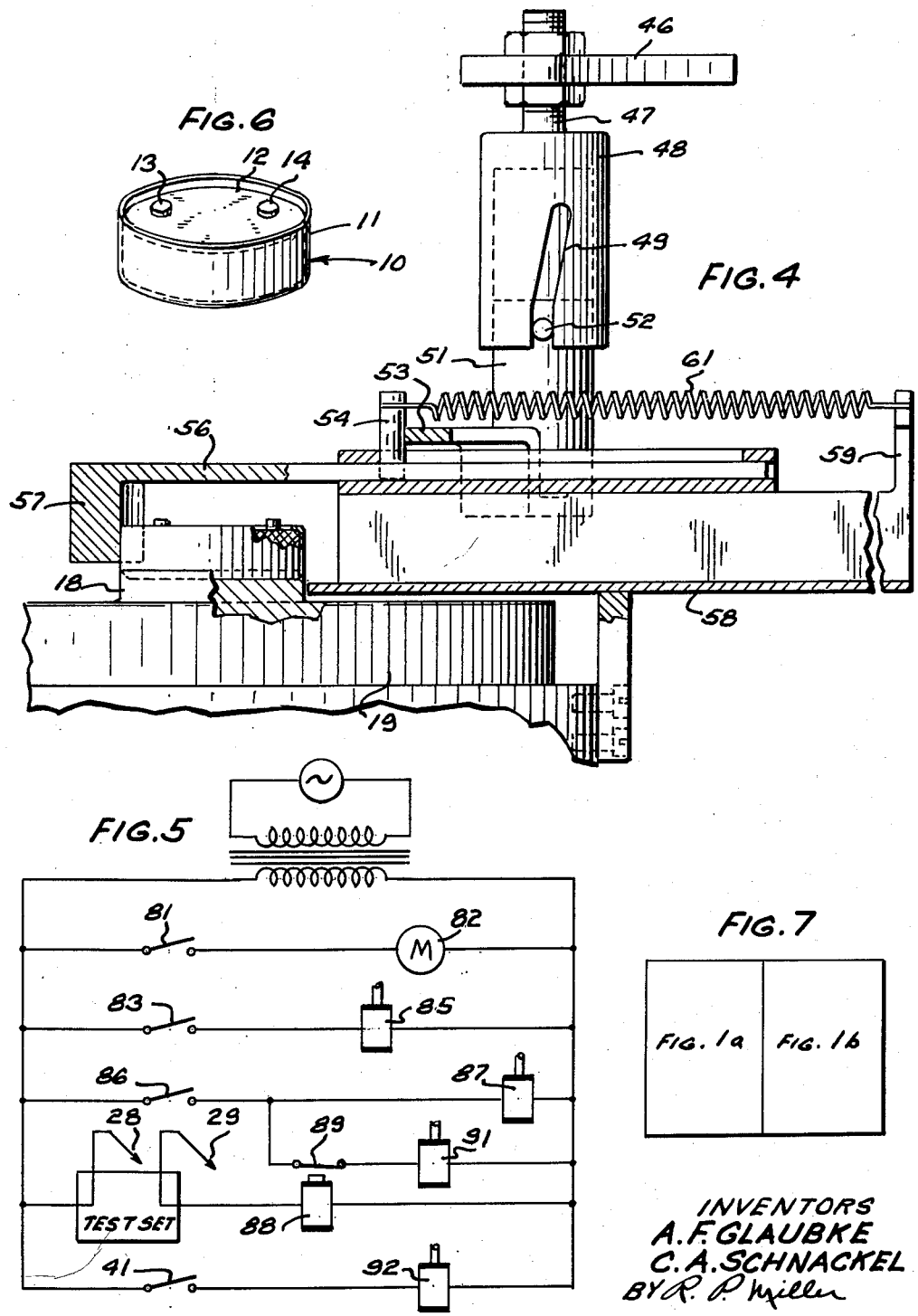

United States Patent Office 2,986,275
Patented May 30, 1961

2,986,275

ARTICLE FEEDING AND EJECTING APPARATUS

Allen F. Glaubke and Charles A. Schnackel, Indianapolis, Ind., assignors to Western Electric Company, Incorporated, New York, N.Y., a corporation of New York Filed Aug. 21, 1957, Ser. No. 679,493

4 Claims. (Cl. 209—81)

This invention relates to article feeding and ejecting apparatus, and more particularly to apparatus for sequentially feeding articles to a testing machine and a fabricating machine together with selectively operable ejector means controlled by each machine.

In the course of continuous manufacturing processes wherein articles are successively advanced through a series of work stations, it is necessary that each partially fabricated article be inspected prior to any subsequent work operations. Upon detection of the defective article, facilities should be provided to eject the defective article from the feed mechanism. In order to obtain full automation of such a system, it is desirable that mechanisms be provided to automatically load and unload the feed mechanism.

It is an object of the present invention to provide an article feed mechanism for selectively advancing an article through a series of work stations together with facilities controlled by the machines at each of the work stations for ejecting the articles from the feed mechanism.

Another object of the invention resides in an ejector device that is selectively positioned in the path of moving articles in accordance with conditions ascertained by a testing device at one of the work stations.

Concomitant with the last object, it is still another object of the invention to provide facilities controlled by the operation of the article feed mechanism for restoring the ejector device to an initial position whereupon an article is removed from the feed mechanism and advanced into a discharge chute.

A further object of the invention resides in a new and unique positive acting ejector mechanism operated by one of the machines at a work station for positively removing successive articles from the feed mechanism.

With these and other objects in view, the present invention contemplates a turntable for successively advancing parts through a testing station and a fabricating station together with ejector devices operated in accordance with the functioning of the machines at the testing and fabricating stations. A first ejector is under the control of facilities at the testing station and operates to eject defective parts from the turntable. The second ejector is operated by the fabricating machine during its cycle of operation and functions to positively remove satisfactory fabricated articles from the turntable. The invention further provides instrumentalities for automatically feeding articles one at a time to the turntable whereupon successive cycles of operation of the entire apparatus are initiated.

Other objects and advantages of the present invention will be apparent from the following detailed description when considered in conjunction with the accompanying drawings, wherein:

Figs. 1a and 1b when assembled in the manner depicted in Fig. 7 illustrate a turntable together with selectively operable ejector mechanisms constructed in accordance with the principles of the present invention;

Fig. 2 is a side elevational view of an electrical continuity testing device adapted to operate on articles advanced by the turntable;

Fig. 3 is a side elevational view taken along line 3—3 of Fig. 1b depicting a crimping mechanism adapted to crimp articles advanced by the turntable;

Fig. 4 is a sectional view taken along line 4—4 of Fig. 1b showing an ejector mechanism for removing articles from the turntable;

Fig. 5 is a circuit diagram showing a control circuit for operating the mechanisms shown in the other figures;

Fig. 6 is a perspective view of an article that is to be tested and fabricated by the machinet shown in the other views, and Fig. 7 is a view illustrating the manner of assembling Figs. 1a and 1b.

Figure 1B:
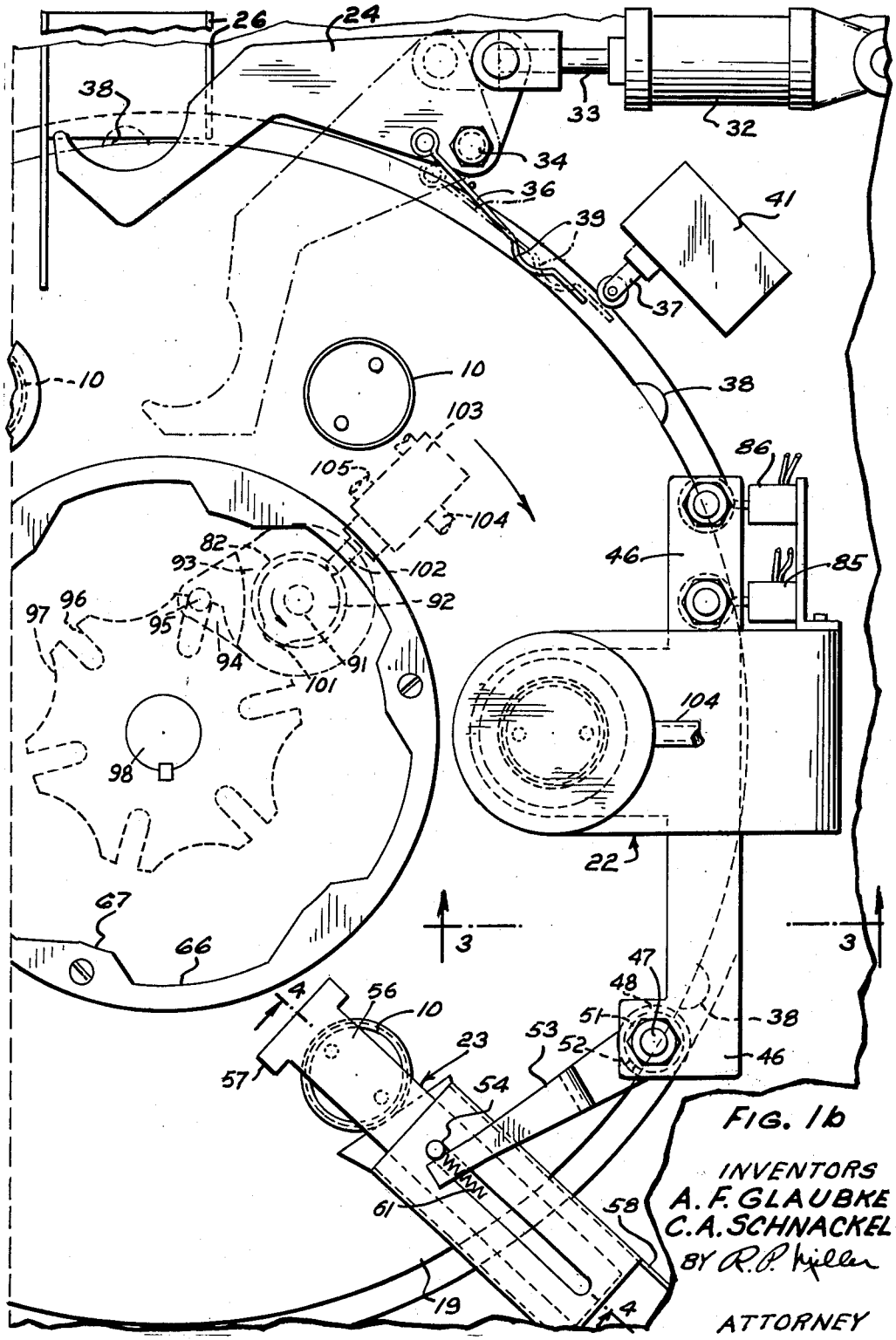

Referring first to Fig. 6, the article 10 to be tested and crimped by the machine shown in the other views is a unit that is to be assembled in the receiver portion of a telephone handset. The article consists of a casing 11 having mounted therein a coil 12 having extending terminals 13 and 14. The present machine is designed to test the continuity of the coil 12 and crimp the upper edges of the rim of the casing 11.

In general, articles 10 are loaded in a chute 16 and are selectively released one at a time by an escapement mechanism generally depicted by the reference numeral 17. The articles released by the escapement mechanism 17 are dropped within raised nests 18 mounted on a turntable 19. A commercially available Geneva gear drive is provided for the turntable 19 so that upon each actuation of the indexing mechanisms, the turntable rotates 60°. The turntable 19 first advances the articles to a test station generally denoted by the reference numeral 21 wherein the continuity of the coils 12 are tested. Upon subsequent advance of the turntable, the articles are moved to a crimping station generally referred to by the numeral 22 whereat the upper rim portions of the casings 11 are crimped. Subsequent advance of the turntable advances each article to a discharge station whereat an ejector mechanism 23 removes the article from the turntable.

If the continuity tester 21 ascertains that a coil is defective, an ejector arm 24 is moved over the surface of the turntable into position to engage the article. Upon subesquent advance of the turntable to move the article from the test station, facilities are operated to restore the ejector arm 24 to initial position to withdraw the advanced defective article from the turntable and move it into a discharge chute 26.

Referring now to Fig. 2, there is shown the continuity tester 21 which consists of a ram 27 having a pair of test probes 28 and 29 mounted thereon. The ram 27 is adapted to move downwardly upon operation of an air cylinder 31. When the ram 27 moves downwardly, the probes 28 and 29 move into engagement with the terminals 13 and 14 whereafter a continuity test is conducted under the control of a test circuit (not shown) of a well known type.

Considering now the operation of the ejector arm 24, if a defective coil is ascertained by the testing device 21, the control circuit shown in Fig. 5 is operated to effectuate the operation of an air cylinder 32. Air cylinder 32 moves a piston 33 toward the left to pivot ejector arm 24 about a pivot pin 34 into the path of the moving articles on the turntable 19. Upon subsequent advance of the turntable 19, the defective article is moved into engagement with the ejector arm 24 and is removed from the nest 18. Movement of arm 24 is accompanied by the movement of a spring-like switch actuator 36 into position so that the free extremity thereof is positioned in alignment with a switch actuator element 37. Mounted about the periphery of the turntable 19 is a series of switch actuator buttons 38 so that upon advance of the turntable 19, a button 38 engages a bow section 39 of the spring 36 to move the extremity of the spring against the switch actuator 37. The switch actuator 37 thereupon operates a momentary limit switch 41 to again operate the control circuit associated with the air cylinder 32. Air cylinder 32 thereupon moves the piston toward the right to pivot the ejector arm in a clockwise direction to withdraw the defective article from the turntable 19. The article thereupon passes to the discharge chute 26.

Attention is directed to Fig. 3 wherein details of the crimping device 22 are shown. This device consists of a crimping ram 42 having a circular crimping surface 43. The position of the crimping ram 42 is controlled by a hydraulic cylinder 44 so that upon application of oil into the cylinder 44, the ram 42 moves downwardly to force the crimping surface 43 against the rim portion of the casing 11 whereupon this rim portion is crimped over.

Referring now to Figs. 3 and 4, the ram 42 has a plate 46 secured thereto. A stud extension 47 is bolted to the plate 46 and has secured to the lower terminus thereof a sleeve 48 having a cam slot 49 formed therein. Rotatably mounted in the frame of the machine and encompassed by the sleeve 48 is a shaft 51 having a cam follower pin 52 secured thereto adapted to ride within the cam slot 49 of the sleeve. Also secured to the shaft 51 is an arm 53 (see also Fig. 1b) adapted to engage at its free terminus a pin 54 secured to a slide 56 forming a portion of the ejector device 23. The slide 56 has an arcuate depending portion 57 which is positioned in register with an article 10 when the turntable is held stationary between indexing operations. Positioned in alignment with the depending portion 57 is a discharge chute 58 secured to the frame of the machine and having an upright anchor post 59. A tension spring 61 is connected between the pin 54 and the anchor post 59 to continuously urge the slide 56 toward the right as viewed in Fig. 4. The effect of the spring 61 is overcome by the pin 52 being held within the cam slot 49.

Upon downward movement of the ram 42, the plate 46 and cam sleeve 48 also move downwardly. The cam follower pin 52 rides within the slot 49 thereby allowing the tension spring 61 to move the pin 54 and slide 56 toward the right. The depending portion 57 of the slide 56 thereupon moves the article 10 from the nest 18 into the discharge chute 58.

In order to operate the escapement device 17, a camming member 66 is mounted on the turntable 19 and has lobes 67 adapted to cooperate with a cam follower roller 68. Cam follower roller 68 is rotatably mounted on a bracket 69 secured to a two arm pivot member 71. A tension spring 72 is provided to continuously urge the cam follower roller into engagement with the camming member 66. Upon advance of the turntable the cam follower roller 68 moves from a lobe 67 whereupon the tension spring 72 is effective to pivot the member 71 about a shaft 73 to withdraw the forward arm of said member from engagement with the leading article 10 in the chute 16. As the member 71 pivots, the rearward arm thereof moves into engagement with the next succeeding article positioned in the chute 16 to hold the remaining articles within the chute. Whenever a lobe is presented to the cam follower roller 68, the member 71 pivots in a counterclockwise direction to position the forward arm thereof within the chute 16 to hold the articles 10 within the chute. Simultaneously therewith the rearward arm moves from engagement with the leading article 10 to permit the entire row of articles to advance a distance equal to the diameter of one article.

Referring now to Fig. 5, a cycle of operation of the apparatus may be understood by a consideration of the circuit diagram. When articles are positioned in the chute 16, a switch 81 is closed to energize a motor 82. Motor 82 is adapted to drive a shaft 91 which has secured thereto a cam member 92 and a driver 93. The driver 93 has an abutting portion 94 to which is secured a driving pin 95. Upon rotation of the shaft 91 under the control of the motor 82, the pin 95 successively engages one of six radial slots 96 which are formed in a wheel 97. The wheel 97 is secured to a shaft 98 which is in turn pinned to the turntable 19. Subsequent to a completion of an indexing of the turntable as a result of the engagement of a slot 96 by the pin 95, a projecting portion 101 of the cam member 92 engages the actuator 102 which controls a valve mechanism 103. Upon being actuated, the valve 103 supplies hydraulic fluid to a conduit 104 from a supply line 105. The supply of hydraulic fluid to the conduit 104 initiates a cycle of operation of the ram 42 at the crimping station 22. The ram 42 moves down and completes a crimping operation, and when a preset pressure is attained the hydraulic system for operating the ram is automatically reversed. The details of construction of this hydraulic system are not shown, inasmuch as such are well known in the art.

When ram 42 and plate 46 start to move down, a switch 83 is momentarily closed by an actuator 84 to energize a solenoid 85. Solenoid 85 controls the application of air to the cylinder 31; consequently, the test set ram 27 is moved downwardly to move the test probes 28 and 29 against the terminals 13 and 14 of the article 10. The test probes 28 and 29 may be maintained in contact with the terminals 13 and 14 until such time as the ram 42 and plate 46 return to the initial position whereupon a switch 86 is momentarily closed by an actuator 90 to energize a solenoid 87. Solenoid 87 functions to reverse the direction of air pressure applied to the cylinder 31, and as a consequence, the ram 27 and test probes 28 and 29 are returned to the initial position.

If the continuity tester 21 ascertains that a coil is satisfactory, a relay 88 is energized to open contacts 89. The opening of contacts 89 precludes the energization of a solenoid 91 upon subsequent closure of the contacts 86. Solenoid 91 is adapted to control an air valve applying air to the cylinder 32; consequently, the ascertainment of a satisfactory coil does not allow the air cylinder to function. If, however, a defective coil is ascertained, the relay 88 is precluded from operation and upon subsequent closure of the contacts 86, the solenoid 91 is operated to admit air to the air cylinder 32. Air cylinder 32 thereupon functions to advance the piston 33 toward the left to pivot ejector arm 24 about the pivot points 34 into the path of the articles 10 on the turntable 19. Upon subsequent advance of the turntable the defective article is advanced into engagement with the ejector arm 24 positioned now in the dotted line position as shown in Fig. 1b. As the ejector arm 24 moved to the dotted line position, the switch actuator 36 is moved so that the extremity thereof is positioned in alignment with the switch actuator element 37 of the switch 41. The movement of the turntable 19 moves a switch actuator button 38 into engagement with the bow section 39 of the spring 36, whereupon, the spring is moved to actuate the switch 41. Closure of switch 41 is followed by the energization of a solenoid 92 that is effective to reverse the direction of the application of air to the air cylinder 32, whereupon the air cylinder returns the ejector arm 24 to the initial position and thus withdraws the defective article from the turntable and deposits it in the chute 26.

In order to initiate a subsequent cycle of the overall machine, the advance of the turntable effectuates the release of another article 10 from chute 16 so that this article operates the switch 81 that initiates another cycle of operation.

It is to be understood that the above described arrangements of apparatus, circuits and construction of elemental parts are simply illustrative of an application of the principles of the invention and many other modifications may be made without departing from the invention.

What is claimed is:
1. In an article feeding and ejecting apparatus, a sup- port frame, a carrier for sequentially advancing articles along a predetermined path from a feeding device to a testing station and a fabricating station mounted on said support frame, camming means secured to said carrier and cooperable with said feeding device for selectively depositing an article on said carrier, means at said testing station for ascertaining the conformity of an article to predetermined specifications, means at said fabricating station for performing an operation on an article which conforms to the predetermined specifications, an ejector device pivotally mounted on said support frame between said testing and fabricating stations adjacent to the path of travel of said carrier, selectively operable control means for said ejector device, means for initiating a test on an article positioned within said testing station concomitantly with the initiation of an operation at said fabricating station, means actuated in response to the detection of a defective article at said testing station for rendering said control means effective to advance said ejecting device into the path of travel of the defective article emanating from said testing station, and switch means engageable with said carrier rendered effective upon the advance of a defective article into engagement with said ejector device to remove said ejector device from the path of travel of subsequent articles emanating from said testing station.

2. In an apparatus for feeding articles to and ejecting defective articles from a carrier having a pair of peripheral surfaces and whereon said articles are positioned for indexible movement therewith relative to a testing device and a fabricating device, a support frame whereon the carrier is movably mounted, an article-supply chute secured to said support frame adjacent to said testing device, an escapement device pivotally mounted on said supply chute, a camming member secured to a first peripheral surface of the carrier for selectively actuating said escapement device to deposit an article on the carrier during each successive indexing thereof, a plurality of cams projecting outwardly from a second peripheral surface of the carrier in uniform spaced relationship conforming to the spacing of the articles positioned thereon, an ejector arm pivotally mounted on said support frame adjacent to the path of travel of the carrier, pneumatic means for selectively pivoting said ejector arm into the path of travel of an article emanating from the testing device, means for conditioning said ejector arm advancing means for operation upon each actuation of the testing device, means for rendering said ejector arm pivoting means operable upon the completion of a testing operation and the ascertainment of a defective article, switch means secured to said support frame adjacent to said ejector arm, a switch actuator secured to said ejector arm and positioned in alignment with said switch means upon the pivoting of said ejector arm into the path of travel of a defective article emanating from said testing device, said switch actuator being cooperable with one of said advancing cams for operating said switch means upon the indexing of the defective article from within the testing device, and means responsive to the actuation of said switch means for restoring said ejector arm to a position adjacent to the path of travel of said articles.

3. In an apparatus for feeding articles to and ejecting articles from a carrier having a peripheral surface and whereon said articles are positioned for indexible movement therewith relative to a testing device and a fabricating device, a support frame whereon the carrier is movably mounted, an article-supply chute secured to said support frame adjacent to said testing device, an escapement device pivotally mounted on said supply chute, a camming member secured to a peripheral surface of the carrier for selectively actuating said escapement device to deposit an article on the carrier during each successive indexing thereof, an ejector mounted for movement on said support frame adjacent to said fabricating device, said ejector normally positioned so as to span the path of travel of articles emanating from said fabricating device, a cam sleeve secured to said fabricating device for movement therewith, a cam follower engageable with said cam sleeve and pivotally mounted on said support frame for controlling the movement of said second ejector relative to said carrier, and resilient means secured to said ejector and said support frame for accomplishing the withdrawal of said ejector and the article engaged thereby from the carrier upon actuation of said fabricating device and the concomitant movement of said cam follower within said cam sleeve.

4. An apparatus for feeding articles to a carrier having a pair of peripheral surfaces whereafter said articles are successively indexed through a testing device and a fabricating device and for removing articles from said carrier upon completion of testing and fabricating operations performed thereon or subsequent to said testing operation if an article so tested does not conform to predetermined specifications, which apparatus comprises a support frame wherein indexing means are mounted for successively advancing articles positioned on the carrier through said testing device and said fabricating device, an article-supply chute secured to said support frame adjacent to said testing device, an escapement pivotally mounted on said supply chute, a first camming member secured to a first peripheral surface of said carrier for selectively actuating said escapement to deposit articles in spaced relationship on said carrier, a plurality of cams positioned about a second peripheral surface of the carrier in uniform spaced relationship, an ejector arm movably mounted between said testing and fabricating devices on said support frame adjacent to the path of travel of said carrier, pneumatic means for selectively advancing said ejector arm into the path of travel of said articles, means for controlling the concomitant initiation of testing and fabricating operations on articles positioned within said devices, means rendered effective by the actuation of said fabrication device for conditioning said ejector arm advancing means for operation, means cooperable with said controlling means for rendering said ejector arm advancing means operable when an article within said testing device is determined to be not in conformity with the predetermined specifications, switch means secured to said support frame adjacent to said ejector arm, a switch actuator secured to said ejector arm, said switch actuator being positioned in alignment with said switch means upon the advance of said ejector arm into the path of travel of said articles and cooperable with one of said advancing cams for operating said switch means, means responsive to the actuation of said switch means for restoring said ejector arm to a position adjacent to the path of travel of said carrier, an ejector slide secured to said support frame adjacent to said fabricating device and spanning the path of travel of articles on said carrier emanating from said fabricating device, a second camming member secured to and advanced upon each operation of said fabricating device, and a cam follower engageable with said cam sleeve and associated with said ejector slide for accomplishing the movement of said slide to remove an article from said carrier during each operation of said fabricating device.

References Cited in the file of this patent
UNITED STATES PATENTS

| | | |
|---|---|---|
| 1,667,420 | Kent | Apr. 24, 1928 |
| 1,808,301 | Ferguson | June 2, 1931 |
| 1,983,388 | Moore | Dec. 4, 1934 |
| 2,591,868 | Puster | Apr. 8, 1952 |
| 2,592,260 | Emerson | Apr. 8, 1952 |
| 2,734,628 | Schlayer | Feb. 14, 1956 |